May 28, 1968  J. W. McKAY  3,385,551
PORTABLE EMERGENCY REFLECTOR DEVICE
Filed Aug. 18, 1965  3 Sheets-Sheet 1
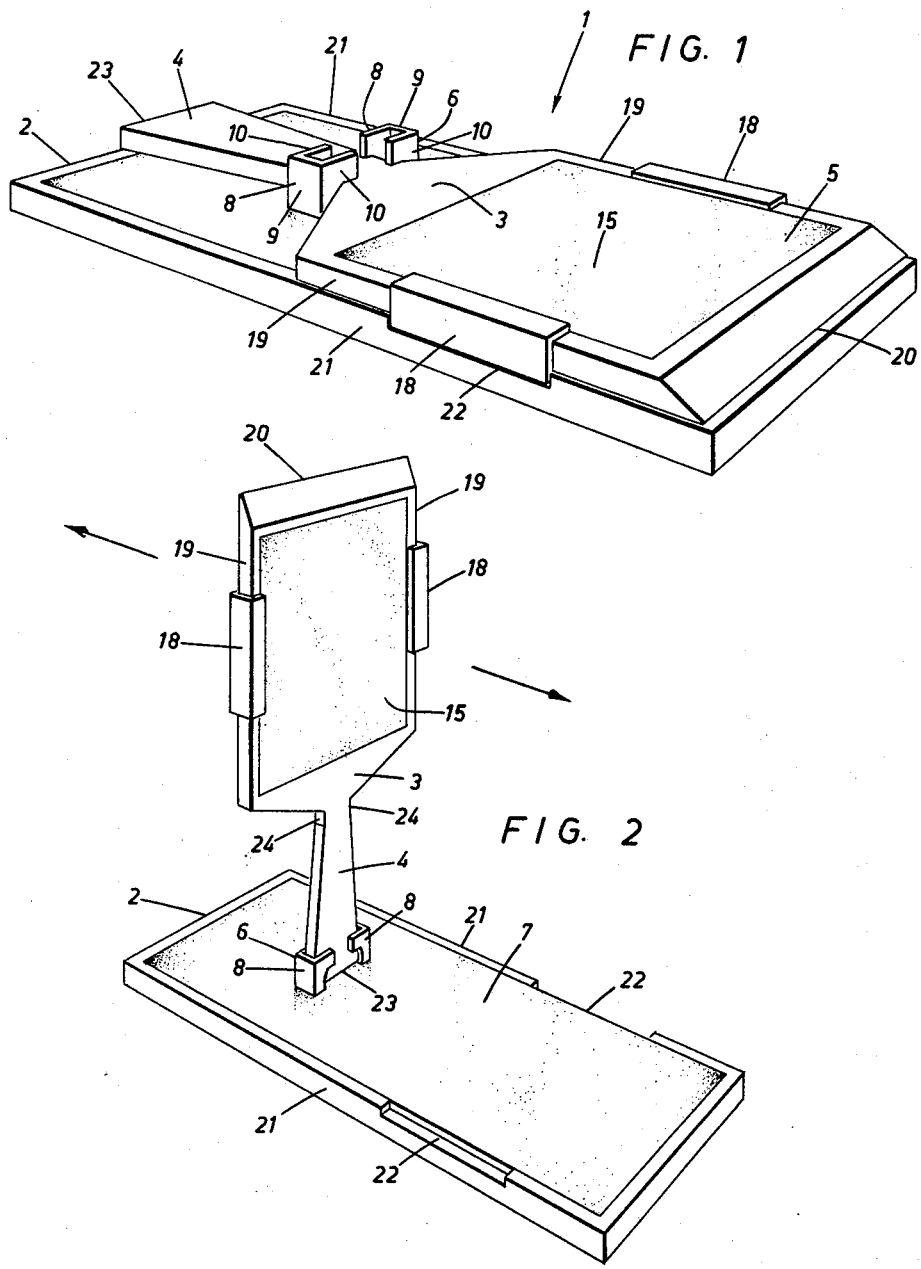
INVENTOR.
JOHN W. McKAY
BY
Agent May 28, 1968   J. W. McKAY   3,385,551
PORTABLE EMERGENCY REFLECTOR DEVICE
Filed Aug. 18, 1965   3 Sheets-Sheet 2

INVENTOR.
JOHN W. McKAY
BY
Agent

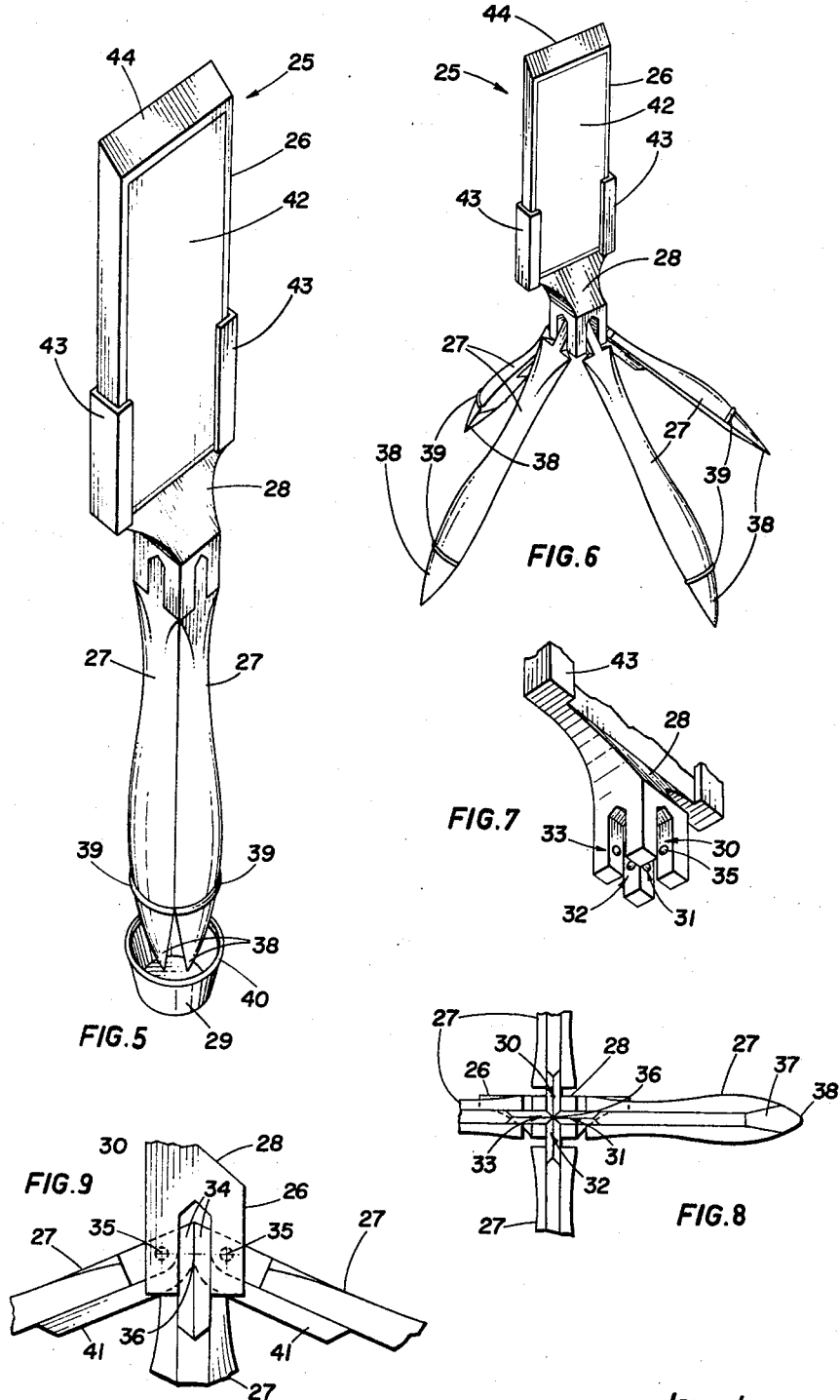

United States Patent Office 3,385,551
Patented May 28, 1968

3,385,551
PORTABLE EMERGENCY REFLECTOR DEVICE
John W. McKay, 9823 149th St.,
Edmonton, Alberta, Canada
Filed Aug. 18, 1965, Ser. No. 480,667
5 Claims. (Cl. 248—467)

ABSTRACT OF THE DISCLOSURE

A portable flare has a flat rectangularly shaped element which has at least one light reflecting surface and a support portion extending longitudinally from said element. The support portion is adapted to permit hand gripping of the flare, or may be engaged with means for selectively retaining said element in an upright attitude. Thus, the flare may either be manipulated by hand or be independently supported in an upright attitude.

This invention relates to a portable reflector flare for use as an emergency signalling device.

Due to the ever-increasing number of vehicles on the highways, and the increased rates of speed at which these vehicles travel, it is becoming essential as a safety measure that each vehicle be equipped with a dependable, simple and inexpensive device to be used as a danger signal in the event that a vehicle must make an emergency stop or is involved in an accident at night time, resulting in the vehicle coming to rest on the shoulder of the highway or partially on and partially off the travelled portion of the highway. Preferably such a danger signal, to be used by the average motorist, should require no maintenance to keep it functional, it should be sturdy in its construction and simple in its application and adaptable to the multiplicity of conditions that may surround the motorist in a time of emergency.

According to the present invention, the foregoing requirements are substantially met by providing a portable reflector flare comprising a flat rectangularly shaped base having a light reflecting surface, and a flat paddle shaped light reflecting member including a blade and a handle that is engageable with the base by means of a connector block secured to the base, the block being so arranged as to allow the paddle to be removably connected to the base with the plane of the paddle disposed either perpendicularly or parallel to the plane of the base. Further, clips and magnetic means are fixed to the flare to enable it to be suspended in several attitudes. To add to the utilitarian aspects of the device, the paddle shaped portion of the flare is provided with a sharpened edge to enable it to be used as an ice scraper in winter weather to clear the windows of the vehicle. The foregoing requirements are also met by a second embodiment of the present invention comprising a flat generally rectangularly shaped light reflecting element having a sharpened edge to enable it to be used as an ice scraper, and which also has an end adapted to pivotally engage a number of stiff slender elements that can be positioned, by means of the pivotal connection, into a parallel bundle to form a handle to hold the device for signalling or scraping ice, or in the alternative the elements can be positioned in spider-leg fashion to form a quadruped whereby they may act as legs to support the reflector in an upright position for the purpose of giving a reflective signal. Further, the second embodiment is provided with a cap that is engageable with the slender elements to lock them together when they are positioned to form a handle, and magnetic means are connected to the plane element to provide means for suspending the flare from a metal surface.

It is an object of the present invention to provide a reflector flare that requires no internal power source to create a visible signal.

Another object of the invention is to provide a reflector flare that is easily and quickly made ready for use in the event of an emergency, while at the same time being capable of compact and convenient storage within the passenger occupied compartment of the vehicle.

A further object of the invention is to provide a reflector flare that can be erected in various attitudes to provide contemporaneous multi-directional reflective signals.

A still further object of the invention is to provide a reflector flare of simple and sturdy design and made from inexpensive materials.

A particular object of the second embodiment of the present invention is to provide a device consisting of integrated pre-assembled components which are movably interconnected to allow the device to perform the functions heretofore described without necessitating the assembly of major components by the user.

The invention will now be described by way of example with reference to the accompanying drawings, in which:

FIGURE 1 is a perspective view of a reflector flare embodying the invention, showing the device assembled for storage in a vehicle;

FIGURE 2 is a perspective view of the reflector flare, showing the device assembled for use and positioned to provide a uni-directional reflective signal;

FIGURE 5 is a perspective view of a second embodiment of the reflector flare of the present invention, showing the reflector flare with its parts disposed to be generally paddle shaped;

FIGURE 6 is a perspective view of the second embodiment of the reflector flare, showing its parts disposed to provide a flare with a spider-leg quadruped supporting means;

FIGURE 7 is a perspective view of a portion of the flare shown in FIGURE 6, showing a mortise arrangement whereby the parts of the flare are interconnected;

FIGURE 8 is a partial bottom plan view of the flare shown in FIGURE 6, showing the interconnection of the parts of the flare; and FIGURE 9 is a partial side view of the flare shown in FIGURE 6, showing the interconnection of the parts of the flare.

Figure 3:
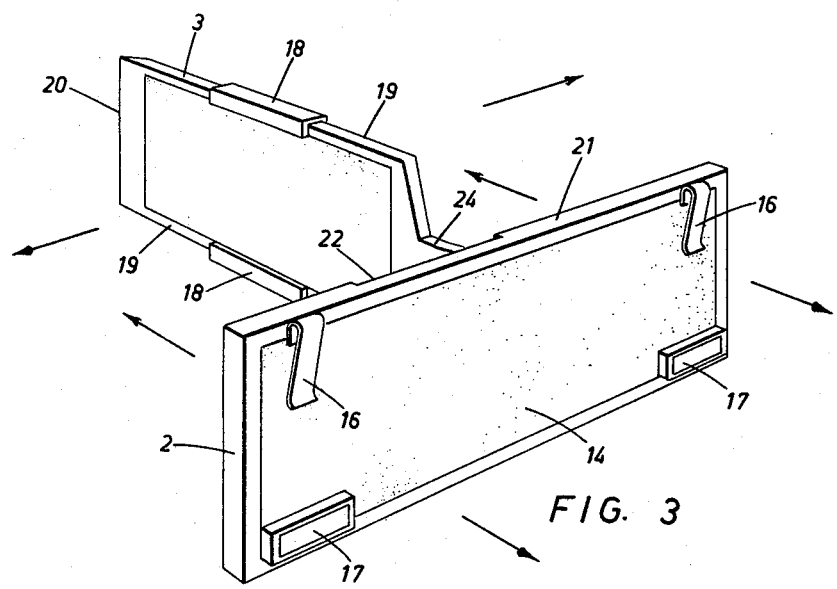
FIGURE 3 is another perspective view of the reflector flare shown in FIGURE 2, positioned to provide multi-directional reflective signals.

The first embodiment of the invention will now be described with particular reference to FIGURES 1, 2, 3 and 4 of the drawings in which, a reflector flare generally designated 1, comprises a rectangularly shaped base 2 and a paddle 3, the said paddle including a handle 4 and a blade 5. Both the base and the paddle are made of plastic or any like suitable material that is light in weight, reasonably strong and generally impervious to normal weather conditions. A connector block generally designated 6 made of an elastically deformable material, is permanently fixed to a surface 7 of the base 2. As shown in FIGURE 4, the block 6 is composed of a pair of spaced apart U-shaped channels 8, 8, each of which has a base 9 and a pair of parallel arms 10, 10. Each arm 10 has an edge 11 parallel to the base 9, and each of said edges is cut away at 12 to form, in conjunction with the surface 7, a slot 13.

Figure 4:
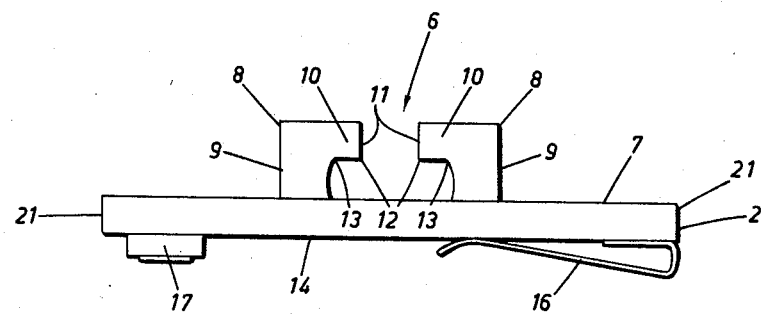
FIGURE 4 is an end view of the base portion of the reflector flare, showing a connector block, a clip means, and a magnetic means, connected thereto.

The surface 7 and a surface 14 (as shown in FIGURE 3) of the base 2 are light reflecting surfaces made by the application of light reflecting paints or tapes that are presently known commercially. Also, the paddle 3 has a light reflecting surface 15 and another light reflecting surface on the other side of the paddle (not shown in the drawings) made in the same manner and similar to the surfaces 7 and 14. As shown in FIGURE 3, permanently secured to the surface 14 of the base 2 are a pair of spring clips 16, 16 and a pair of magnets 17, 17. Further, a pair of magnets 18, 18 are secured to a pair of parallel edges 19, 19 of the blade 5, and an edge 20 of the blade portion of the paddle 3 is tapered to form a sharpened knife-like edge. Also, in a pair of parallel edges 21, 21 of the base 2 and in the surface 7, is a pair of slots 22, 22, into which the magnets 18, 18 will fit when the paddle is positioned as shown in FIGURE 1.

The connector block 6 is so arranged that an end 23 of the handle 4 may be inserted into the grooves formed between each base 9 and the parallel arms 10, 10 of each channel 8 and thereby the paddle may be secured to the base and disposed perpendicular thereto as shown in FIGURES 2 and 3. Also, the handle 4 has a narrow flattened section 24 that is engageable, by deformation of the channels 8, 8 in the slot 13 in each of the arms 10, thereby removably securing the paddle to the base in parallel relationship as shown in FIGURE 1.

When carrying the reflector flare in a vehicle, the base 2 and the paddle 3 are connected in parallel relationship as shown in FIGURE 1, thus providing a flat compact unit which is readily stored. A preferred embodiment of the device is approximately 9½ inches long by 4½ inches wide by 1 inch high which enables it to be stored in a conventional glove compartment of an automobile or truck. Alternatively, it can be suspended from a conventional sun visor by means of the spring clips 16, 16, or it can be removably secured to an inner metal surface of a vehicle by means of the magnets 17, 17.

In time of emergency the reflector flare can be employed in many ways as conditions demand. The paddle 3 can be connected in perpendicular relationship to the base 2 and the unit placed with the base upon the ground and the paddle 3 in an upright position as shown in FIGURE 2. With this arrangement the surface 15 and the surface on the other side of the paddle blade (not shown in the drawings) will provide a reflective light signal visible to other vehicles having lights that approach the flare on a line generally perpendicular to the light reflecting surfaces of the paddle blade. Thus, if the plane of the paddle is placed at right angles to the centre line of a road, the reflector flare will be visible to vehicles approaching from either direction on the road by giving off a reflective signal as indicated by the directional arrows shown in FIGURE 2.

If an emergency takes place at the intersection of two roads, the flare can be laid on its side as shown in FIGURE 3, and thereby provide reflective signals visible to vehicles approaching from either direction on each of the roads forming the intersection as indicated by the directional arrows shown in FIGURE 3.

Also, the flare can be placed on the trunk lid, hood or top of a stopped vehicle and held in position by the force of the magnets 17, 17. Further, the flare can be suspended from an upper window edge of a vehicle by means of the clips 16, 16. Moreover, if it is desirable the paddle and base portions of the reflector may be employed separately to provide a danger signal. For example, the base 2 can be suspended by the clips 16, 16 from a window of a vehicle, or secured to a metal part of the vehicle by the magnets 17, 17, while at the same time the paddle 3 can be secured to another metal part of the vehicle by the magnets 18, 18, or the paddle can be held in the hand and moved about to signal approaching traffic. A further feature of the paddle 3 completely collateral to its function as a reflector flare, is the provision of a knife-like edge 20 at the end of the blade 5 to enable the paddle to be used as an ice scraper to clear the windows of a vehicle in winter weather.

The second embodiment of the invention will now be described with particular reference to FIGURES 5, 6, 7, 8 and 9 of the drawings, in which a reflector flare generally designated 25, comprises a rectangular-shaped plane element 26, four identical stiff, slender leg elements 27 pivotally connected to the plane element by means of a connector or block 28, and a cap 29 that is engageable with an end of each slender element. All of the major parts of the flare are made of similar material to that used for the parts of the first embodiment. The connector block 28 is an integral part of the plane element 26 and is mortised at 30, 31, 32 and 33 to form a hollow cruciform section to receive a tenoned end 34 of each of the stiff slender elements 27. As shown in FIGURES 8 and 9, each end 34 of an element 27 is pivotally connected in its respective slot in the block 28 by means of a ball and socket connector 35. Also, the end 34 of each element 27 is shaped in wedge-like fashion whereby an edge 36 of each end 34 binds upon the other edges 36 with which it is in contact when the slender elements 27 are positioned in spiderleg fashion as shown in FIGURE 6, FIGURE 8 and FIGURE 9 to form a flare supporting quadruped. In this position, the elements 27 have been swung outwardly away from one another so that diametrically opposed elements form a contained angle of approximately 160 degrees at which position the binding effect of each wedge-like end 34 prevents further outward movement thereby providing a stable support for the flare. Moreover, each slender element 27 has a flattened portion 37 at a pointed end 38 remote from the pivoted end. The flat portions 37 are each disposed at an angle to the centre line of each leg element 27 so that each flat surface 37 will be generally horizontal when the legs are swung outwardly and the reflector is standing in an upright position.

In FIGURE 5, the stiff slender leg elements 27 are shown in their most inward position in a parallel bundle thereby creating a handle member. Near the pointed end 38 of each leg element 27 is a ridge 39 which is engageable with a groove 40 in the cap 29, such engagement locking the leg elements together. Each wedge-shaped end 34 retains the wedge-like cross section throughout a thickened portion 41 of each element 27, and thus along the length of the thickened portion 41 of each element 27 there is a solid interconnection of all the elements which, along with the engagement of the cap 29, creates a stable and firm handle member.

As shown in FIGURES 5 and 6, the rectangular-shaped plane element 26 has a light reflecting surface 42 which, as in the other embodiments of the invention, is made by the application of light reflecting paints or tapes that are presently known commercially. Also, the element 26 has another light reflecting surface on its other side (not shown in the drawings) made in the same manner and similar to the surface 42. Further, a pair of magnets 43 are secured to the edges of the plane element 26 whereby the plane may be secured to a metal object if desired. A knife-like edge 44 is provided along one edge of the element 26 to facilitate the use of the device as an ice-scraper.

While the reflector flare is being carried in a vehicle, the slender elements 27 are positioned as shown in FIGURE 5 and the cap 29 is secured in position by engagement of the ridges 39 and the grooves 40. Thus, the device is always conveniently available to be used as an ice-scraper when needed.

When the flare must be used to perform its signalling function in a time of emergency, it may be held in the hand to warn on-coming traffic of an obstruction on the road, or it may be suspended from the obstructing vehicle itself by means of the magnets 43. Alternatively, the cap 29 can be removed and the leg elements 27 swung outwardly to form the quadruped base for the reflector, allowing it to be placed in an upright position upon the roadway, or on the trunk lid, hood, or top of a stopped vehicle. If it is desirable, when the cap 29 is removed, the leg elements 27 may be kept in the form of a handle and the pointed ends 38 may be pressed into the ground to secure the reflector in an upright position.

It is to be understood that the form of the invention herein shown and described is to be taken as a preferred example of the same, and that various changes in the shape, size and arrangement of the parts may be resorted to without departing from the spirit of the invention or the scope of the subjoined claims.

What is claimed is:

1. A portable reflector flare comprising a base having a light reflecting surface, a flat paddle shaped light reflecting member adapted to be removably connected to the base, a connector having a plurality of channel grooves and slots secured to the base whereby the paddle is removably connected to the base and disposed perpendicular or parallel thereto, a clip means secured to the base, a magnetic means secured to the base and to the paddle, the said clip means and magnetic means providing means whereby the flare is suspended.

2. A portable reflector flare comprising a flat rectangularly shaped base having a light reflecting surface, a flat paddle shaped light reflecting member including a handle and a blade having a sharpened edge, a connector block fixed to the base including a plurality of slots and channel grooves adapted to receive the handle, the said handle including a narrow flattened portion adjacent the blade adapted to engage the plurality of slots whereby the paddle is connected to the base and disposed parallel thereto, and the said handle including an end portion adapted to engage the channel grooves whereby the paddle is connected to the base and disposed perpendicular thereto, a clip means and a magnetic means connected to the flare whereby the flare is suspended.

3. A portable reflector flare comprising a generally rectangularly-shaped plane reflector flare, the end of which is tampered to a knife-like edge, and a plurality of stiff, slender elements, the said plane element having another end adapted to be pivotally engageable with each of the stiff slender elements at one end of each of said stiff elements, the pivotal engagement providing for positioning of the said stiff elements in parallel relationship to each other and to the plane element, cap means adapted to be contemporaneously engageable with the other end of each said stiff elements such that the cap means may simultaneously engage each said stiff element thereby providing a handle means for holding the reflector flare and by removal of the cap providing for positioning of the said stiff elements in spider-leg fashion for locating and maintaining the plane element in an upright position.

4. A portable reflector flare as claimed in claim 3 wherein a magnetic means is fixed to the plane element whereby the reflector flare may be suspended.

5. A portable reflector flare as claimed in claim 3 wherein the portable reflector flare is paddle-shaped.

References Cited
UNITED STATES PATENTS

| | | | |
|---|---|---|---|
| D. 140,582 | 3/1945 | Winslow | 248—470 |
| 286,699 | 10/1883 | Hornberger | 248—471 |
| 2,051,406 | 8/1936 | Green | 248—470 |
| 2,235,284 | 3/1941 | Carver | 248—472 |
| 2,517,119 | 8/1950 | Le Duc. | |
| 2,612,695 | 10/1952 | Schneider et al. | 248—156 X |
| 2,802,443 | 8/1957 | Hanson | 248—472 X |
| 2,995,983 | 8/1961 | Davis | 248—467 X |
| 3,225,475 | 12/1965 | Shank | 248—467 X |

ROY D. FRAZIER, *Primary Examiner.*

JOHN PETO, *Examiner.*

W. D. LOULAN, *Assistant Examiner.*